(12) United States Patent
Coelho Nunes

(10) Patent No.: US 10,538,901 B2
(45) Date of Patent: Jan. 21, 2020

(54) MODULAR ELECTRICAL APPLIANCE WHICH REUSES GREYWATER

(71) Applicant: Bio-Microbics, Inc., Shawnee Mission, KS (US)

(72) Inventor: César Manuel Coelho Nunes, Verin (ES)

(73) Assignee: BioMicrobics, Inc., Lenexa, KS (US)

(*) Notice: Subject to any disclaimer, the term of this patent is extended or adjusted under 35 U.S.C. 154(b) by 0 days.

(21) Appl. No.: 15/036,738

(22) PCT Filed: Nov. 12, 2014

(86) PCT No.: PCT/ES2014/070837
§ 371 (c)(1),
(2) Date: May 13, 2016

(87) PCT Pub. No.: WO2015/071517
PCT Pub. Date: May 21, 2015

(65) Prior Publication Data
US 2016/0258136 A1    Sep. 8, 2016

(30) Foreign Application Priority Data
Nov. 14, 2013 (ES) .................................. 201331655

(51) Int. Cl.
*E03B 5/00* (2006.01)
*E03B 1/04* (2006.01)
*E03D 5/00* (2006.01)

(52) U.S. Cl.
CPC .............. *E03B 1/042* (2013.01); *E03D 5/006* (2013.01); *E03B 2001/045* (2013.01)

(58) Field of Classification Search
CPC . E03B 1/04; E03B 1/041; E03B 1/042; E03D 5/003
USPC .............. 137/356, 376, 563, 565.01, 565.16, 137/565.17, 565.19; 4/665
See application file for complete search history.

(56) References Cited

U.S. PATENT DOCUMENTS

| | | | | |
|---|---|---|---|---|
| 4,162,218 A * | 7/1979 | McCormick | ............ | C02F 1/006 137/386 |
| 5,498,330 A * | 3/1996 | Delle Cave | ............... | E03B 1/04 210/103 |
| 5,845,346 A * | 12/1998 | Johnson, Jr. | ............... | E03B 1/04 4/665 |
| 6,182,306 B1 * | 2/2001 | Han | ........................ | E03D 1/003 137/270 |
| 6,355,160 B1 * | 3/2002 | Wiseman | ................ | C02F 1/001 137/114 |

(Continued)

*Primary Examiner* — Reinaldo Sanchez-Medina
(74) *Attorney, Agent, or Firm* — Polsinelli PC

(57) ABSTRACT

Modular electrical appliance for recycling greywater, connected to: a drainage pipe (S1) via which greywater enters into the greywater reservoir (1) thereof; a sanitary water supply (S) via which sanitary water enters into the auxiliary reservoir (7) thereof; and a flush pipe (D) which connects to the standard opening of the tank (WC) of a toilet.

The electrical appliance has a built-in three-way valve (4) which opens the outlet of said greywater reservoir (1) if it contains a sufficient amount for a full flush. If not, the outlet of said auxiliary reservoir (7) is opened.

A hydraulic pump (3) connected to the electrovalve (4) pumps the flush water, grey or sanitary, through the flush pipe (D).

13 Claims, 3 Drawing Sheets

(56) References Cited

U.S. PATENT DOCUMENTS

| | | | | |
|---|---|---|---|---|
| 7,066,197 B1* | 6/2006 | Gray | ............ | E03B 1/04 |
| | | | | 137/112 |
| 7,534,070 B1* | 5/2009 | Urban | ............ | A01G 25/00 |
| | | | | 137/357 |
| 7,913,331 B2* | 3/2011 | Hartman | ............ | E03B 1/04 |
| | | | | 4/665 |
| 8,607,377 B2* | 12/2013 | Borg | ............ | E03B 1/041 |
| | | | | 4/665 |
| 2007/0174959 A1* | 8/2007 | Sanders | ............ | E03D 5/003 |
| | | | | 4/665 |
| 2010/0122738 A1* | 5/2010 | Williamson | ............ | C02F 1/004 |
| | | | | 137/356 |
| 2010/0212758 A1* | 8/2010 | Postacchini | ............ | E03B 1/04 |
| | | | | 137/565.16 |
| 2011/0289672 A1* | 12/2011 | Cummings | ............ | E03B 1/04 |
| | | | | 4/603 |

* cited by examiner

MODULAR ELECTRICAL APPLIANCE WHICH REUSES GREYWATER

OBJECT OF THE INVENTION

The object of the present invention is a modular electrical appliance for recycling greywater to flush toilets, which comprises a greywater reservoir and a sanitary water tank, and does not require handling the components of the toilet tank.

BACKGROUND OF THE INVENTION

Greywater recycling devices for flushing toilets are known in the state of the art.

The utility model document ES 1074716U describes a recycling device requiring a double flush tank provided with a greywater inlet and a second network clean water inlet associated with a float configured to regulate a reserve level of said clean water in the tank. Therefore, this recycling device requires a system with two water inlets for flush in the tank of the toilet. However, this represents a great disadvantage for use as the standard toilet tanks only incorporate a single water inlet or opening for flush.

A similar disadvantage would be found in the patent document WO2012118363A1 which describes a compact tank with a greywater reservoir fed from the drain of a sink or shower, and which pumps said greywater into the tank of a toilet. Therefore, the drawback of such systems or devices is that if sufficient greywater for flush is not generated, they cannot flush enough water in the toilet. To obtain a full flush, these types of devices or systems require a second inlet of sanitary or public water in the toilet tank.

Similarly, the recycling device of shower water described in the document ES1075605U only provides a greywater supply. For this purpose, it incorporates a dispenser of disinfectant for greywater and a time programmer for dosing disinfectant in case of long periods of time without a flush.

The document ES1076233U describes a device for recycling greywater in toilets that requires a large number of devices such as a first auxiliary greywater reservoir and a second greywater storage tank, becoming a multi-device system, some of considerable volume, which prevents their use as another modular electrical appliance.

The system or device described in ES2319076B1 patent does not also allow using it as an electrical appliance for consisting of a toilet that, in itself, integrates the collection and storage of greywater from sinks, showers, bidets, to perform its own cleaning of wastewater. This whole process takes place in the main body, which receives greywater from the bathroom electrical appliances through a header pipe which, after filtering, is pumped into two tanks, one being the tank and the other the storage tank, located under the tank, which, together with the collection mechanisms and systems form a main body, which together with the toilet body form a compact unit. As its operation is fully automatic, it allows choosing the water with which to flush the toilet: water from the supply system, greywater, or both at once. But, however, for not being modular, this invention cannot be used in a toilet installed without new works and without replacing elements already present in that toilet.

The heat exchanger and recycling device of greywater which is the object of the ES2344497A1 patent comprises an enclosure fitted with two compartments hermetically isolated from each other and each provided with respective inlets and fluid outlet, the first compartment being intended for storing greywater from a bathtub, shower or the like, and the second for containing the clean water flowing toward a tap or the like (therefore, without outlet of clean water into the tank of a toilet). The device is provided with means for pumping greywater contained in the first compartment, driven by the clean water flowing through the second compartment. Thus, the device comprises a heat exchanger between the greywater stored in the first compartment and the clean water that is introduced into a second compartment through the corresponding fluid inlet. Also an object of this patent ES2344497A1 is a system for the utilization of domestic greywater comprising a device according to the invention, wherein one of the fluid outlets (that of the greywater) of the device is connected to the tank of a toilet.

In general, it is very common that the known recycling devices require the placement of a second system of level sensors inside the toilet tank. To do this, it is known to replace the screws that secure the tank to the toilet by specific screws, of the same diameter as the screws that are being replaced, but with holes through which the water recycled from a wastewater tank circulates and is discharged into the tank. In this way, these known systems, by replacing the supply of sanitary water from the tank, the tank is fed from another point and a different height, requiring the placement of a second level sensor within the tank for recycled water.

Therefore, the devices described have some of the following disadvantages:
  High volume and non-modular, complication of installations and underutilization.
  They usually have a non-decorative appearance, requiring concealment, normally occupying storage spaces in cabinets not intended or designed for these devices or under the sink.
  Difficult in terms of installation and maintenance.
  Require the use of pills or liquid disinfectants in the greywater reservoir, and therefore regular maintenance.
  Require installing additional equipment or modifications in the toilet tank with consequent inconvenience, need for specialized technicians for the modifications and risks of water leakage during installation, operation, or system maintenance.

DESCRIPTION OF THE INVENTION

The present invention is configured as a device of exposed face, modular, recycling greywater. Therefore, it is a modular electrical appliance for recycling greywater with an internal functional part and an outer housing with a protective functionality which, in addition, allows providing the device with an aesthetic appearance unusual in devices recycling greywater. The object of the present invention overcomes the above described disadvantages of the devices of the prior art.

This recycling device comprises a greywater reservoir connected to the drains of sinks, bathtubs, washing machines, showers, etc. and a second tank, auxiliary, independent from such greywater reservoir, connected to the sanitary water supply.

It is a recycling device of simple installation which does not need any installation within said toilet tank because it supplies it through a flush pipe connected to the opening of sanitary water itself to the toilet tank.

So, when the level of water decreases in the toilet tank, a pressure switch is activated due to the change of pressure and a hydraulic pump of the recycling device is activated. By default, the device of the present invention automatically sends to the toilet tank, through the hydraulic pump, greywater stored in the greywater reservoir of said device.

A sensor associated with the greywater reservoir detects if its volume is insufficient for a complete flush. If the greywater reservoir is empty, or does not contain a sufficient volume of greywater for a flush, said sensor detects the lack of volume and activates a three-way valve that changes the position of the opening in the greywater reservoir to an open position of said sanitary water tank. In this case, sanitary water stored in the auxiliary reservoir is sent to the toilet through the same flush pipe connected between the recycling modular electrical appliance and the opening of the toilet tank.

Said auxiliary reservoir is connected to the sanitary water supply.

Therefore, the installation of the recycling device object of the present invention eliminates completely the sanitary water intake from the toilet tank, thus only water coming from the recycling device, gray or sanitary water, being used for flushing the toilet.

As indicated, the flush water coming from the recycling device enters into the tank through the opening where sanitary water was previously entering in the toilet from the toilet tank itself. Therefore, no further changes for the entry of flush water into the toilet or the toilet tank are required; for example, it will not be necessary to install a second float or water level sensor in the tank because the flush water enters the tank from the same point and height as the flush provided for sanitary water.

The present invention incorporates UV lamp technology in the greywater reservoir for removing almost the entire pathogen load that can be generated in the greywater stored in the greywater reservoir. This eliminates the need to periodically refill the device with disinfectant fluids or tablets.

The device may incorporate an anti-vandalism lock with key which immovably fastens said outer housing to the inner or functional part of the electrical appliance. Thus, it can be advantageously used in the hotel sector or in public facilities.

The device incorporates an electrical box, for example, with programmable elements, that regulates or contacts the hydraulic pump, valves and sensors based on various parameters (capacity of the tank, flushing and supply speeds, safe filling thresholds, etc.).

The electrical appliance may also be provided with a structural body for attachment to an external structure such as walls, furniture, internal portions of furniture, etc.

DESCRIPTION OF A PREFERRED EMBODIMENT

Figure 1:
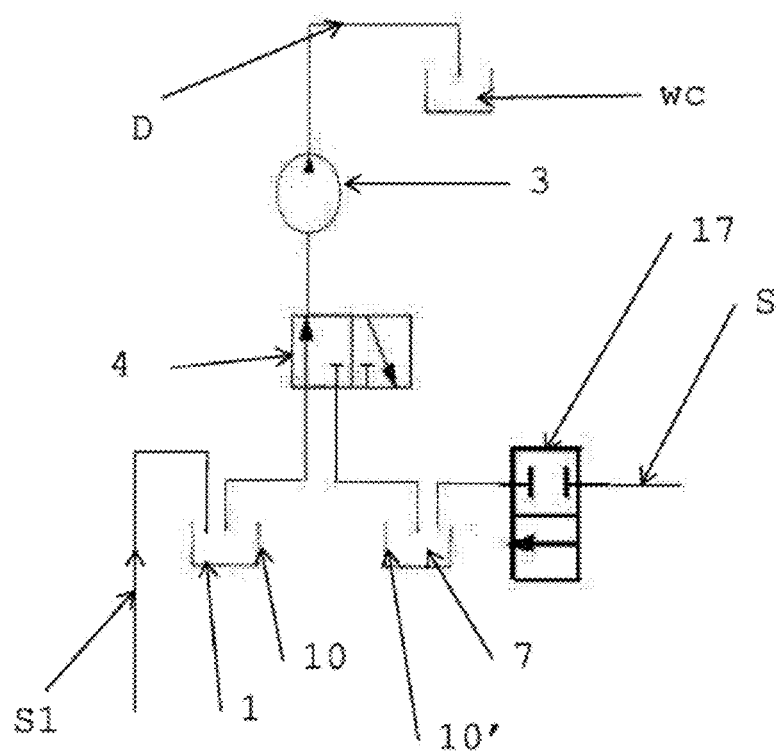
FIG. 1: hydraulic diagram of the modular electrical appliance for greywater recycling of the present invention.

FIG. 1, the hydraulic diagram of the present invention, illustrates a modular electrical appliance for recycling greywater. The water used in the sink would exits from it through a drain that ends in a "T" with two outlets, a first outlet being a drainpipe of greywater (S1) to a greywater reservoir (1) contained in the electrical appliance (or recycling device), and a second outlet (not shown) to the sink drain itself.

Figure 2:
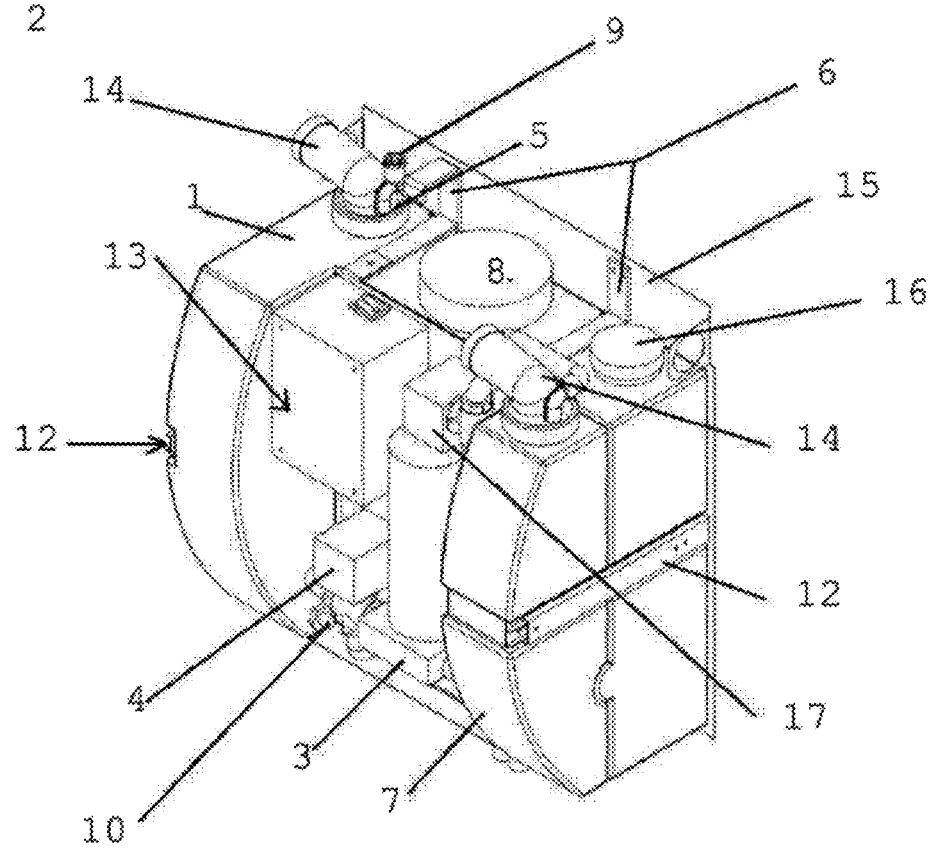
FIG. 2: perspective view of the inner or functional part of the device of the present invention.
Figure 4:
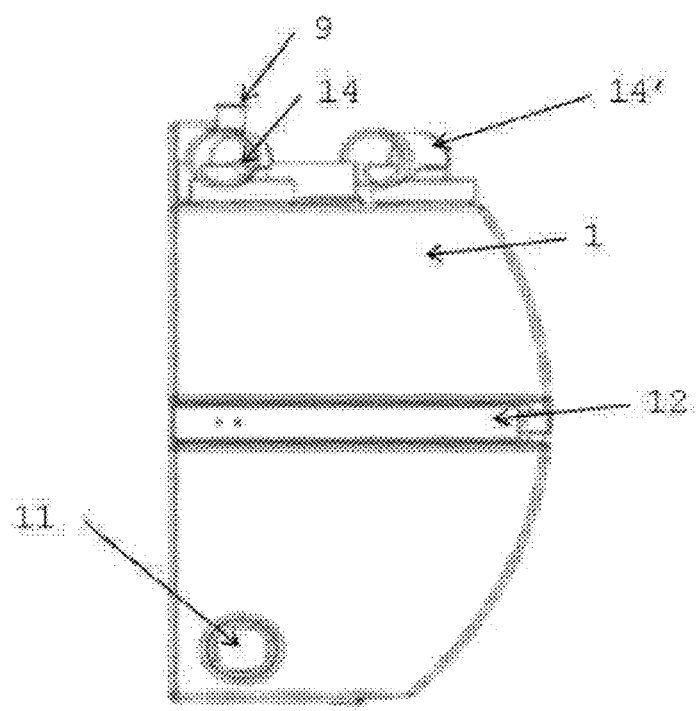
FIG. 4: lateral view of the inner or functional part of the device of the present invention.

As shown in FIGS. 1, 2 and 4, the greywater drainpipe (S1) is connected to the greywater reservoir (1) of the recycling device through a threaded elbow aerator (14). A prefilter (5) is located (see FIG. 2) at the connection between the elbow (14) and the tank (1) to retain the largest particles in accordance, for example, with the rules of Royal Decree 314/2006. A second additional filter (not shown) can be placed upstream of the aerator. In a second alternative (FIG. 6), the aeration function can be performed by a vent (200) independent from the drain (S1)-greywater reservoir (1) connection.

Figure 3:
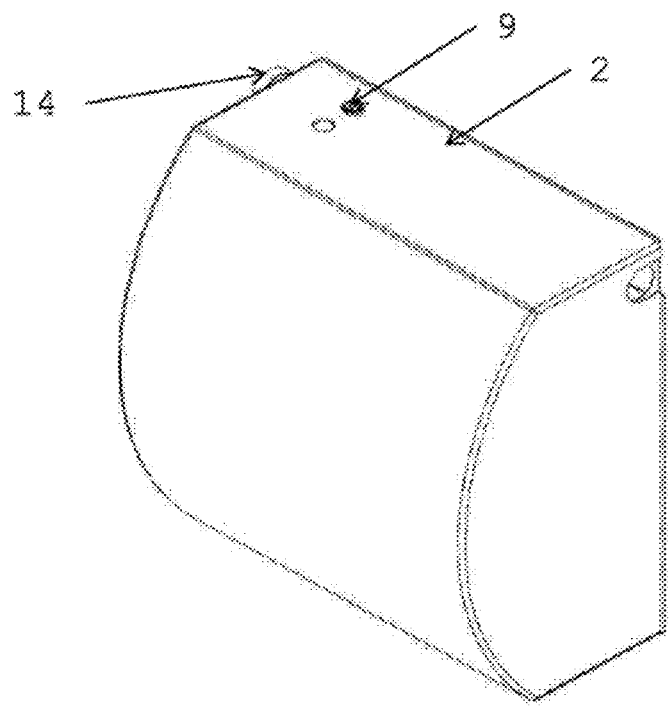
FIG. 3: perspective view of the outer housing covering the inner or functional part of FIG. 1.
Figure 5:
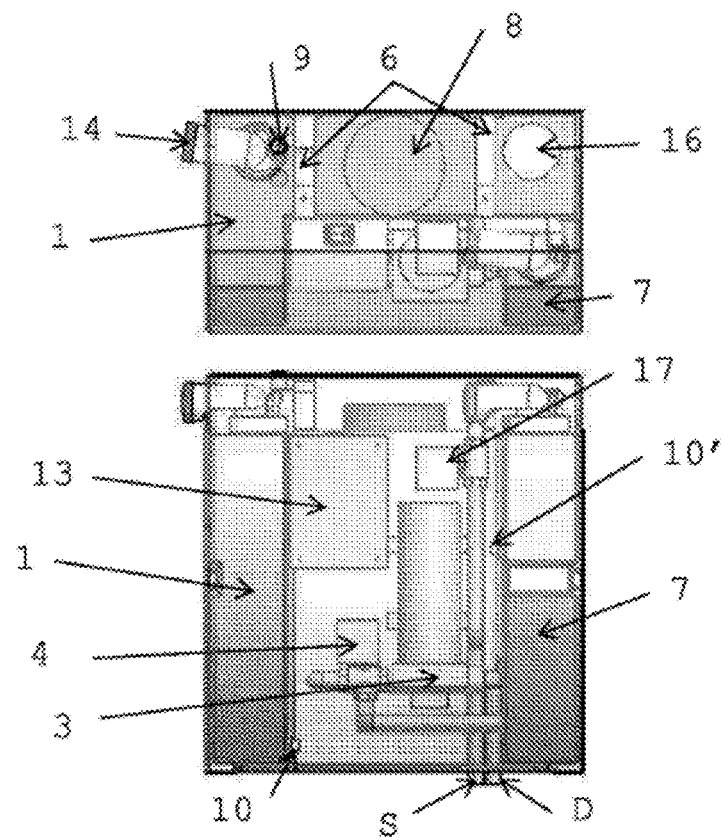
FIG. 5: plan and elevation views of the inner or functional part of the device of the present invention.
Figure 6:
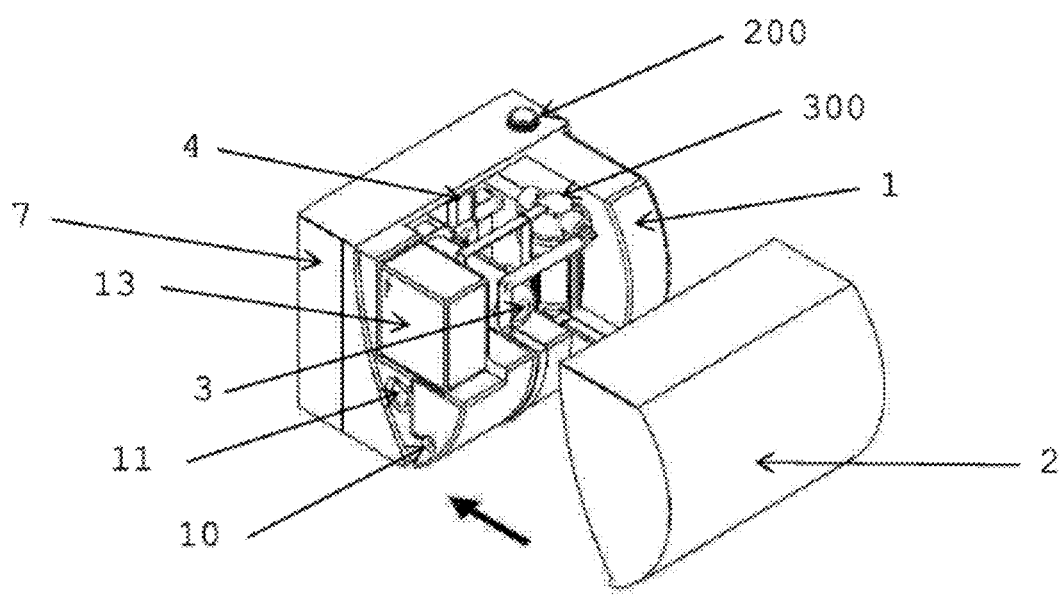
FIG. 6: perspective view of a second alternative of the electrical appliance device.

The recycling device also incorporates an independent auxiliary reservoir (7), i.e., not connected to the greywater reservoir (1). In the alternative of FIGS. 2, 4 and 5, said auxiliary reservoir (7) has in its upper part an additional aerator elbow (14') through which no water enters. This aerator elbow is covered and protected by an outer housing (2), as shown in FIG. 3. In the alternative of FIG. 6, the additional aerator (14') is omitted.

The recycling modular electrical appliance incorporates a hydraulic pump (3) having sufficient pressure to fill the tank of a toilet (WC) in the time stipulated by the applicable regulations, for example, the technical building code. This pump (3) is connected by a pipe (e.g. multilayer, crosslinked polyethylene or copper), at its output to the tank (WC), and at its input to the output of a three-way electrovalve (4). In the second alternative of FIG. 6, a pre-exit filter is incorporated (300) at the pump outlet (3).

FIGS. 1, 2 and 5 show that the electrical appliance incorporates a three-way electrovalve (4) with a first water inlet connected to the greywater reservoir (1), and a second water inlet connected to the auxiliary reservoir (7). This electrovalve (4) gives way, by default, to the water from the greywater reservoir (1) when the tank (WC) needs a water discharge.

The three-way electrovalve (4) closes the passage of greywater and allows the passage of sanitary water (7) when the greywater reservoir does not have enough water for a discharge. For this purpose, a sensor (10) located in the greywater reservoir (1) detects a predetermined minimum volume level of greywater stored in said reservoir.

In both cases, the hydraulic pump (3) (see FIG. 1) pushes the water discharge (grey or sanitary) to the tank (WC) of the toilet through a flush pipe (D).

FIG. 5 illustrates the flush pipe (D) of the recycling device to the toilet tank (WC), and the inlet pipe of sanitary water (S) to the auxiliary reservoir (7).

The three-way valve (4) is connected by a polyethylene pipe, or other approved types according to UNE 1717 standard, to the two tanks (1, 7) and to the hydraulic pump (3) by, for example, a multilayer pipe.

On the other hand, FIGS. 2 and 4 illustrate an alternative in which a sanitary two-way electrovalve (17) having an inlet connected to the public or sanitary water network, and an outlet connected to the public or sanitary water tank (7). This sanitary electrovalve (17) is normally closed and only opens when the auxiliary sensor (10') located in the auxiliary reservoir (7) indicates that there is a sufficient predetermined level of water in said reservoir (7).

FIGS. 2 and 5 illustrate a threaded maintenance lid (8) for the opening to clean the greywater reservoir (1) and, in case of breakdown, to repair it.

FIGS. 2 and 5 illustrate a sealed electrical box (13) which regulates: the hydraulic pump (3), the three-way electrovalve (4) and sensor (10), and the sanitary two-way electrovalve (17) and auxiliary sensor (10'). FIG. 6 illustrates an alternative in which the electrical box (13) only connects the hydraulic pump (3), the three-way electrovalve (4) and the sensor (10).

As shown in FIGS. 2 and 5, the aerator elbow (14) of the greywater reservoir (1) can be placed on top of either sides of the greywater reservoir (1). To do this, two threading points for the aerator (14) are provided on top of the tank (1), the free point being covered by a screw cap (16) so as not to lose water (see FIGS. 2 and 5). Alternatively, as shown in FIG. 6, a point for placement of a vent (200) is provided.

FIG. 4 illustrates a UVA lamp (11) installed in said greywater reservoir (1).

FIGS. 2 and 4 illustrate the electrical appliance which has a structural body (6) for attachment to an external structure such as walls, furniture, interior parts of furniture, etc.

FIGS. 3 and 4 illustrate the outer housing (2) that protects the internal or operating elements of the recycling device. The outer housing (2) is fixed via a guide (12) on the outer side surface of the reservoirs (1, 7).

FIG. 2 shows that the device incorporates, in addition, an anti-vandalism lock (19) which fastens the outer housing (2) to the inside of the recycling electrical appliance.

FIG. 2 shows a rear protection (15) in the form of a metal sheet fixed to the structural body (6) which completely encloses, next to the outer housing (2), the inside of the modular electrical appliance for recycling greywater.

When the water level decreases in the toilet tank (WC), the pressure switch (not shown and located in said hydraulic pump) is activated due to the pressure change and powers said hydraulic pump (3). Thus, the recycling device automatically sends to the toilet tank (WC), and through the hydraulic pump (3), the recycled greywater, which is located in the greywater reservoir, or sanitary water stored in the auxiliary reservoir (2), all depending on the state of opening of the three-way electrovalve (4).

The invention claimed is:

1. A modular electrical appliance for recycling greywater, connected to a greywater drainage pipe (S1) and connected to a flush pipe (D) of a tank (WC) of a toilet, the modular electrical appliance comprising:
    a greywater reservoir (1) connected to said greywater flush pipe (S1), wherein the greywater flush pipe is connected to one or more greywater sources selected from a group comprising of sinks, bathtubs, washing machines, and showers, said greywater flushpipe (S1) being connected to the greywater reservoir (1) via a first aerator threaded elbow (14), and
    an independent auxiliary reservoir (7), said auxiliary reservoir (7) being connected to a sanitary water supply (S), said auxiliary reservoir (7) comprising a second aerator elbow (14') in its upper part, wherein no water enters the second aerator elbow (14') and
    a hydraulic pump (3) comprising a pressure switch, and said hydraulic pump (3) being connected to said flush pipe (D), and
        characterized in that it further comprises a three-way electrovalve (4), this three-way electrovalve (4) comprising:
    a first inlet connected to said greywater reservoir (1),
    a second inlet connected to said auxiliary reservoir (7), and
    an outlet connected to said hydraulic pump (3), and
        in that said flush pipe (D) is connected to a standard inlet opening of sanitary water from said tank (WC), wherein the greywater reservoir (1), the independent auxiliary reservoir (7), and the hydraulic pump (3) of the modular electrical appliance are external to the tank (WC) and said three-way electrovalve (4) is, by default, open towards the greywater reservoir (1).

2. Electrical appliance according to claim 1, characterized in that the auxiliary reservoir (7) is connected to the sanitary water supply (S).

3. Electrical appliance according to claim 2, characterized in that the auxiliary reservoir (7) is connected to the sanitary water supply (S) via a two-way electrovalve (17).

4. Electrical appliance according to claim 1, characterized in that the first aerator threaded elbow (14) comprises a prefilter (5).

5. Electrical appliance according to claim 1, characterized in that the greywater reservoir comprises a vent.

6. Electrical appliance according to claim 1, characterized in that it comprises a sensor located in the greywater reservoir, said sensor being capable of detecting a predetermined minimum level of volume of greywater stored in said tank.

7. Electrical appliance according to claim 1, characterized in that it comprises an auxiliary sensor located in the auxiliary reservoir, said auxiliary sensor being capable of detecting a predetermined minimum level of a volume of water stored in the auxiliary reservoir.

8. Electrical appliance according to claim 1, characterized in that it comprises an electrical box connected, at least, to the hydraulic pump, to the electrovalves and to a sensor.

9. Electrical appliance according to claim 8, characterized in that said electrical box (13) is further connected to a sanitary two-way electrovalve (17) and to the auxiliary sensor (10').

10. Electrical appliance according to claim 1, characterized in that said greywater reservoir comprises a UVA lamp.

11. Electrical appliance according to claim 1, characterized in that it comprises a protective outer housing.

12. Electrical appliance according to claim 11, characterized in that said protective outer housing (2) comprises a lock with a locking key.

13. Electrical appliance according to claim 1, characterized in that it comprises a structural body for securing to a wall.

* * * * *